US006976167B2

(12) United States Patent
Nenashev

(10) Patent No.: US 6,976,167 B2
(45) Date of Patent: Dec. 13, 2005

(54) CRYPTOGRAPHY-BASED TAMPER-RESISTANT SOFTWARE DESIGN MECHANISM

(75) Inventor: Michael A. Nenashev, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 884 days.

(21) Appl. No.: 09/891,145

(22) Filed: Jun. 26, 2001

(65) Prior Publication Data

US 2002/0199100 A1 Dec. 26, 2002

(51) Int. Cl.[7] .............................................. G06F 11/30

(52) U.S. Cl. ...................... 713/168; 713/182; 713/186; 713/194; 713/200; 713/201

(58) Field of Search ............................... 713/168, 182, 713/186, 194, 200, 201

(56) References Cited

U.S. PATENT DOCUMENTS 6,035,398 A * 3/2000 Bjorn ......................... 713/186
6,041,411 A * 3/2000 Wyatt ......................... 713/200

* cited by examiner

*Primary Examiner*—Thomas R. Peeso
(74) *Attorney, Agent, or Firm*—Pillsbury Winthrop Shaw Pittman LLP

(57) ABSTRACT

An arrangement is provided for tamper-resistant software to protect high-security data. In an embodiment, high-security authorization information is encrypted using a fingerprint that is computed based on a protected portion of a data access program. When the program is executed, a runtime fingerprint is computed based on the protected portion of the program to decrypt the high-security authorization information. Access to the the high-security data is allowed only when the decryption is successful.

29 Claims, 7 Drawing Sheets

100

CRYPTOGRAPHY-BASED TAMPER-RESISTANT SOFTWARE DESIGN MECHANISM

BACKGROUND

Aspects of the present invention relate to software. Other aspects of the present invention relate to software security.

Tampering with software involves unauthorized access and modification to software. Such acts often directly associate with security issues. For example, altering network security software to perform what it is not designed to do may pose a serious threat to network security. Similarly, changing application software that transfers secure data from one computer system so as to expose that secure data may compromise that secure data.

To ensure software integrity, different protection mechanisms have been attempted. The most common practice to protect data access is the use of passwords. With a password based mechanism, an operator who initiates the data (software) access supplies a password which is then authenticated against a matching predetermined password that is either hard coded in the software or stored in, for example, a file on the file system. With a password mechanism, it is assumed that both the operator and the software are trusted parties during data manipulation.

Another approach to secure software access is through access right control. For example, secure software may only be accessed with a certain level of access right such as administrator's privilege. Many Unix systems allow designated software to be executed at a higher level of permission than the default level of permission granted to the current login. Other types of security systems rely on a certificate authority. Such systems implement security measures by allowing a file system to "fingerprint" software at the system administrator's level. Some advanced security systems enforce secure software access based on encryption key management mechanisms.

Conventional approaches to ensuring software and data integrity often depend on the underlying operating system implementation or other hardware components and sometimes require significant installation and maintenance effort. Static encryption key management mechanisms of some conventional approaches to ensure software and data integrity provide static, instead of dynamic, key management, which is inflexible and easier to compromise. Furthermore, the conventional approaches do not provide the means to identify software tampering that has been committed.

BRIEF DESCRIPTION OF THE DRAWINGS

The inventions presented herein are described in terms of specific exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
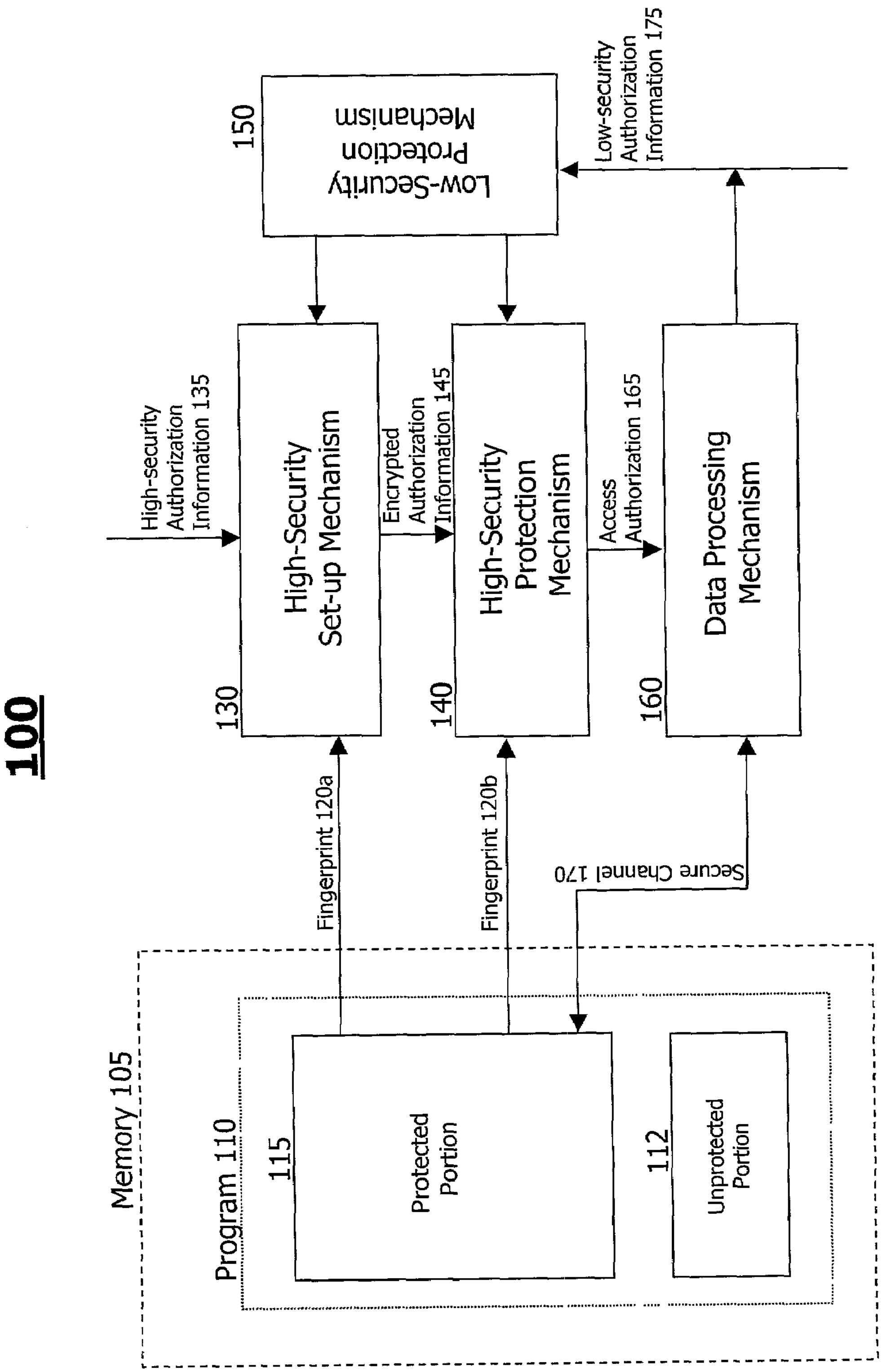
FIG. 1 depicts a high level architecture of an embodiment of the present invention.

FIG. 1 depicts a high level architecture of a tamper-resistant high-security software protection mechanism 100 and the environment in which it operates. The tamper-resistant high-security software protection mechanism 100 sets up and enforces cryptography-based high-security protection of an informational resource based on a protected portion 115 of a program 110 stored in a segment of a memory 105. As will be apparent to those skilled in the art, a protected portion 115 of the program 110 may compose the whole program 110. In FIG. 1, the tamper-resistant high-security software protection mechanism 100 includes a high-security set-Intel up mechanism 130 and a high-security protection mechanism 140, both of which operate with the protected portion 115 of the program 110 to achieve tamper-resistant high-security protection. Optionally, a low-security protection mechanism 150, as shown in FIG. 1, may provide low-security protection to the program 110. A data processing mechanism 160 accesses the protected portion 115 through a secure channel 170 authorized by the tamper-resistant high-security software protection mechanism 100 only when no software tampering took place with respect to the protected portion 115.

The tamper-resistant high-security software protection mechanism 100 provides security measures against an act to gain access to protected data through program tampering. A program may include source code that implements objects and methods as well as the corresponding executable code, compiled from the source code and installed and running in memory 105. A program may access secure information that needs to be protected. Such secure information may include files on a file system, attributes from a table in a database, or any other electronic data from an informational data resource that can not be compromised.

A tampering act may include changing source code of a program, (hence also the corresponding executable code after the compilation) to expose the values of protected variables. When any tampering act is detected, the tamper-resistant high-security software protection mechanism 100 prevents the protected portion of the secure program from being executed.

The tamper-resistant high-security software protection mechanism 100 traces software tampering through a dynamically computed fingerprint (120*a* or 120*b*). A fingerprint is a unique identifier of the protected portion 115 and is computed on-the-fly based on some invariant characteristics of the protected portion 115. Invariant characteristics used to generate a fingerprint may be determined in such a way that they are invariant with respect to different executions, if there is no tampering act, yet sensitive to any change introduced by tampering acts. For example, the content of a random access memory (RAM) block allocated to an object does not change between executions unless the source code is changed. In this case, the region between the starting and the ending address of such a block may be used as an invariant characteristic in computing a fingerprint. As will be apparent to those skilled in the art, any number of invariant characteristics can be used to compute a fingerprint and any number of algorithms can be used to generate the fingerprint based on invariant characteristics.

The invariance may be defined with respect to certain scope. For example, memory allocation strategy may differ from computer to computer. In this case, the invariance may be defined within the scope of a physical machine. A program may have different versions and each may correspond to a different fingerprint due to different invariant characteristics. Furthermore, the selection of invariant characteristics may depend on the nature of the program and the application environment in which the program operates.

The fingerprint (120*a* and 120*b*) of the protected portion 115 is computed based on invariant characteristics. As long as the protected portion 115 is not tampered, the message digest computed from the non-tampered protected portion remains identical. The fingerprint 120*a* is generated during the initial set-up and is immediately used to encrypt the supplied authentication information. The encrypted authentication information is then stored for future use of detecting tampering on the program 110.

The authentication information may include an administrator-level account/password pair or a token. To initially set up tamper-resistant high-security protection for the protected portion 115 of the program 110, an administrator with high-security authority activates the high-security set-up mechanism 130 and provides the authentication information.

In the tamper-resistant high-security software protection mechanism 100, a symmetrical encryption scheme may be applied to the high-security authorization information 135 to set up tamper-resistant protection to the data accessed by the program 110 from one or more informational resources. With a symmetrical encryption scheme, the high-security authorization information 135 is encrypted, with a dynamically generated key, during the initial set-up process. Once the encrypted high-security authorization information is saved, it can be retrieved and decrypted only when an exactly identical key is used to decrypt it. Utilizing this property of a symmetrical encryption, the tamper-resistant high-security software protection mechanism 100 uses a fingerprint that is tightly coupled with the invariant characteristics of a secure program or the protected portion 115, as a key for both encryption and decryption purposes.

In FIG. 1, the fingerprint 120*a,* computed during a high-security protection set-up process, is used, by the high-security set-up mechanism 130, as the key to encrypt the high-security authorization information (supplied by the administrator). The encryption may be performed once to generate an encrypted high-security authorization information 145 which is later decrypted in a symmetrical encryption scheme, in an attempt to detect changes made to the protected portion 115, which may constitute an attempt to gain access to data from protected resources.

The tamper-resistant high-security protection may need to be set-up again whenever there are operating environment changes. For example, when a new compiler is installed, the fingerprint 120*a,* as the encryption key in a symmetrical encryption scheme, may have to be re-computed if runtime memory allocation addresses are used in computing the fingerprint 120*a*. When the computer on which the program 110 is installed is upgraded (e.g., memory size is increased), the fingerprint 120*a* may also need to be re-computed. Yet another different factor that affects the fingerprint 120*a* is when a different version of the program is installed. If the new version of the program 110 includes changes to the original source code, the corresponding new fingerprint may substantially differ from the fingerprint computed from the previous version of the program.

The fingerprint 120*a* encodes the normal state of the protected portion 115 of the program 110. When it is used to encrypt the high-security authorization information, the symmetrical encryption scheme ensures that only a key that encodes an identical normal state of the program 110 can be successfully used to decrypt the encrypted high-security authorization information. That is, if there is any change in a fingerprint computed, at runtime, from the protected portion 115 of the program 110, such change indicates that the protected portion 115 at the runtime is not identical to the original version. Hence, software tampering may have occurred. In this case, the authentication information may not be retrieved and access to information can not succeed. Such runtime protection is enforced through the high-security protection mechanism 140.

During runtime, when the protected portion 115 is accessed, the high-security protection mechanism 140 is activated. To enforce the high-security protection (which detects any tampering on the protected portion 115), the encrypted high-security authorization information is retrieved based on the fingerprint 120*b* generated on-the-fly using the characteristics of the runtime protected portion 115. The high-security protection mechanism 140 uses the fingerprint 120*b,* as a key to decrypt the retrieved encrypted high-security authorization information 145 that is set up during the initial installation process performed by, for example, an administrator. If the protected portion 115 is not tampered, the fingerprint 120*b* is identical to the fingerprint 120*a*. In that case, the fingerprint 120*b* can lead to a successful decryption. Otherwise, the decryption attempt will fail, thus indicating that the protected portion 115 of the program 110 has been tampered with.

There are different approaches to computing a fingerprint. For example, a hash function may be used to compute a one-way hash on the portion of the RAM where the protected portion 115 resides. Such a hash function may traverse the byte array of the protected portion 115 and generate a message digest of the protected portion as the fingerprint 120*a* or 120*b*. There are existing standard methods such as the Secure Hash Algorithm (SHA) (SHA-1 is a method for secure hashing; it is approved by the U.S. Federal Information Processing Standards (FIPS) and specified in FIPS 180-1, Secure Hash Standard (SHS), currently located at URL:http://www.itl.nist.gov/fipspubs/fip180-1.htm) that generate a message digest based on a hash function. A message digest generated by a SHA possesses important properties. For example, it is computationally infeasible to hash two different input byte arrays to a same digest. In addition, a message digest computed using a hash function does not reveal anything about the input used by the hash function.

At runtime, multi-layer protection may also be optionally supported. For example, to activate the program 110, a data processing mechanism 160 (which may correspond to a person or an application) may need to supply a low-security authorization information, such as a password to the low-security protection mechanism 150. Only when the low-security protection mechanism 150 grants the access based on, for example, password clearance, may the program 110 be executed. Activation of the high-security protection may be transparent to the data processing mechanism 160. The high-security protection may be automatically triggered whenever the protected portion 115 is accessed.

Figure 2:
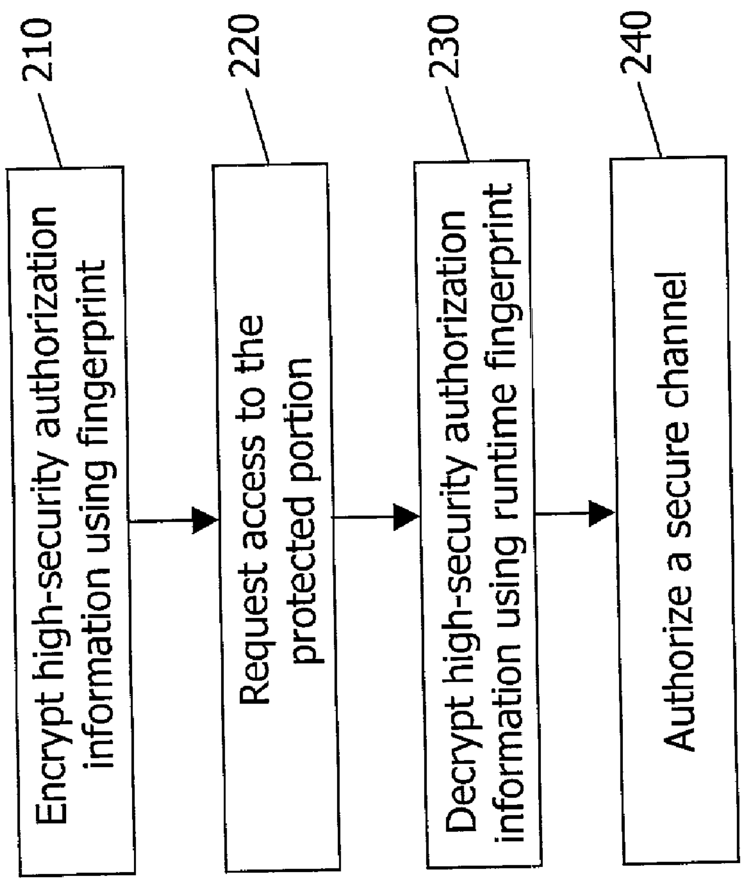
FIG. 2 is an exemplary flowchart of a process, in which an unintended execution of a software program is prevented based on a fingerprint computed dynamically from a protected portion of the program, according to an embodiment of the present invention.

FIG. 2 is an exemplary flowchart of a process, in which a protected portion (e.g., 115) of a program (e.g., 110) is used to prevent unauthorized access to protected resource according to an embodiment of the present invention. In FIG. 2, tamper-resistant high-security protection is first initialized. The high-security authorization information, provided by an authoritative administrator, is first encrypted, at 210, using a fingerprint (e.g., 120*a*), computed from the protected portion during the set-up process, as the encryption key.

At runtime, whenever the protected portion 115 is accessed at 220, the encrypted high-security authorization information is retrieved and is decrypted, at 230, using a fingerprint (e.g., 120*b*), computed from the protected portion of the program at runtime, as the key. If the decryption is successful (i.e., the protected portion 115 is not tampered), a secure channel is authorized at 240.

Figure 3:
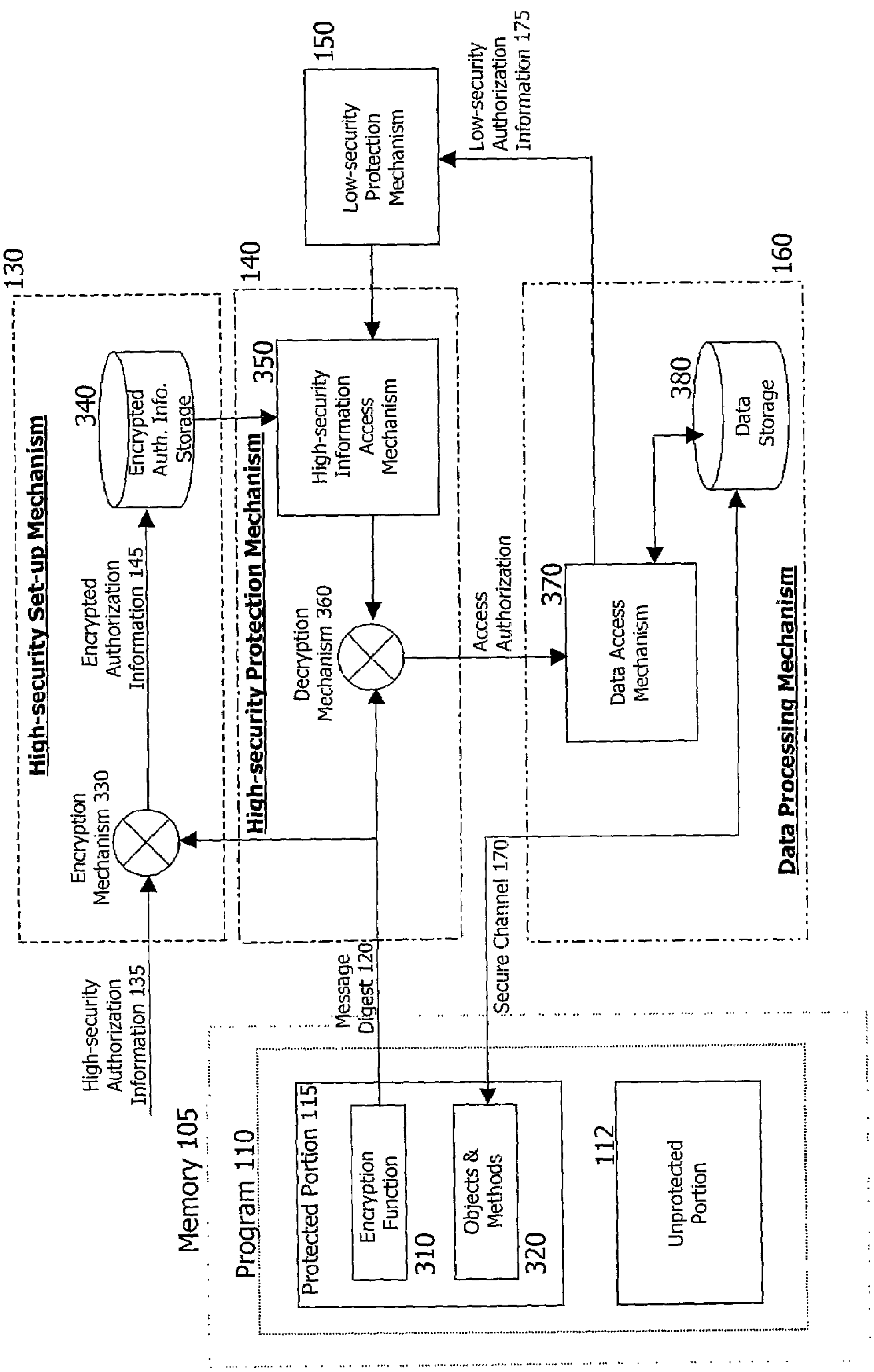
FIG. 3 depicts a high-security program protection mechanism of an embodiment of the present invention.

FIG. 3 depicts a detailed high level functional block diagram of the tamper-resistant high-security software protection mechanism 100 of an embodiment of the present invention. In FIG. 3, the protected portion 115 within the program 110 includes an encryption function 310 and a set of objects and methods 320. The encryption function 310 is responsible for computing a fingerprint 120 based on some invariant characteristics of the protected portion 115. The encryption function 310 may be realized as a hash function. For example, a SHA hash function may be adopted. The encryption function 310 resides inside of the protected portion 115 and is triggered to compute a fingerprint whenever the protected portion is accessed.

In FIG. 3, the high-security set-up mechanism 130 comprises an encryption mechanism 330, which encrypts, using the fingerprint 120 as a key, the high-security authorization information 135 to generate encrypted authorization information 145, and an encrypted authorization information storage 340, which stores and provides the encrypted authorization information 145. The stored encrypted authorization information 145 is later used at runtime to enforce high-security protection to data from secure information resources.

The high-security protection mechanism 140 comprises a high-security information access mechanism 350, which retrieves the encrypted authorization information 145 from the storage 340, and a decryption mechanism 360 that decrypts the retrieved encrypted authorization information 145 using a message digest, as a key, computed from the protected portion 115 on-the-fly. The high-security information access mechanism 350 may be triggered when the protected portion is accessed. The decryption mechanism 360 is the counterpart of the encryption mechanism 330 in a symmetrical encryption scheme.

In FIG. 3, the exemplary data processing mechanism 160 includes a data access mechanism 370 and a data storage 380. The data access mechanism 370 initiates the access to the program 110. Such initiative may be from a human operator or from an application program, such as a regularly scheduled replication job. As shown in FIG. 3, the data access mechanism 370 may interface with a low-security protection mechanism 150 to initiate the access. For example, if the data access mechanism 160 corresponds to a human operator, low-security authorization information 175, such as a password or a token, may be provided.

The data storage 380 in the data processing mechanism 160 may be used to store information that may be accessible to the data access mechanism 370. Such information may be generated (written) by a method in the protected portion 115. For example, a secure data replication method in the protected portion 115 may duplicate data in a data storage for replication purposes (a secure data replication mechanism is discussed later in referring to FIG. 6 and FIG. 7). A protected method may also retrieve data from the data storage 380. For example, a secure data replication method may copy data from the data storage to another data storage. For security reasons, any data exchange between the data storage 380 and the protected portion 115 is through a secure channel 170 which may be granted only when it is verified that the protected portion 115 is not tampered with.

Figure 4:
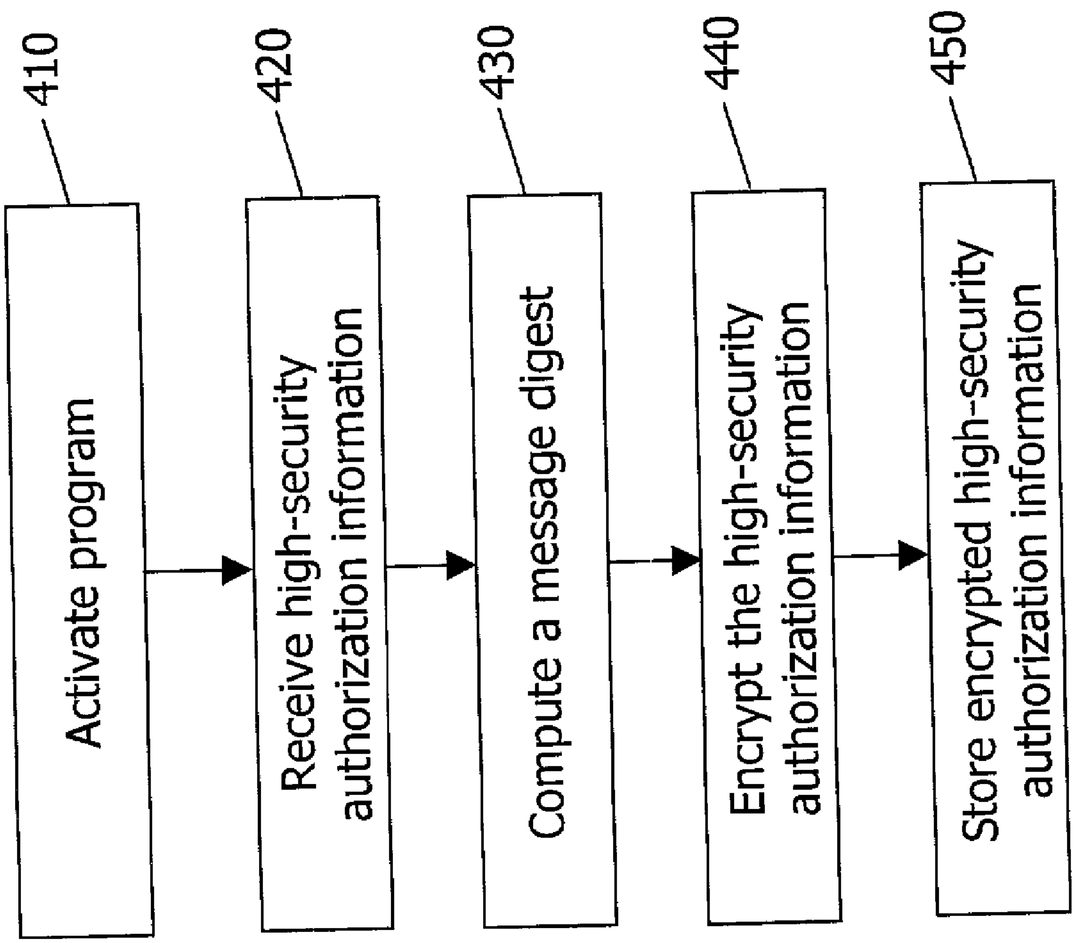
FIG. 4 is an exemplary flowchart of a process, in which high-security is initially set up to protect a secure portion of a program, according to an embodiment of the present invention.

FIG. 4 is an exemplary flowchart of a process, in which the high-security set-up mechanism 130 sets up tamper-resistant high-security protection using a protected portion (e.g., 115) of a program (e.g., 110), according to an embodiment of the present invention. The initial set-up process may be initiated by a a system administrator. A system administrator may install the program 110 and set up tamper-resistant high-security protection, prior to its use, to ensure A that the data is accessed in a secure fashion.

In FIG. 4, the program 110 is first activated at 410. The program 110 includes a protected portion 115 that aggregates different items in the program 110 to provide protection to the accessed data by preventing the execution of the program 110 whenever any change in the protected portion 115 that may be due to an tampering act is detected. High-security authorization information 135 is received at 420. The high-security authorization information 135 is provided by, for example, the personnel who initiates the set-up process. To encrypt the high-security authorization information, the encryption function 310 located in the protected portion 115 computes the message digest 120*a* at 430, based on the invariant characteristics of the protected portion 115. The fingerprint 120*a* is used as an encryption key to encrypt, at 440, the high-security authorization information. The encrypted high-security authorization information 145 is then stored, at 450, in the encrypted authorization information storage.

Figure 5:
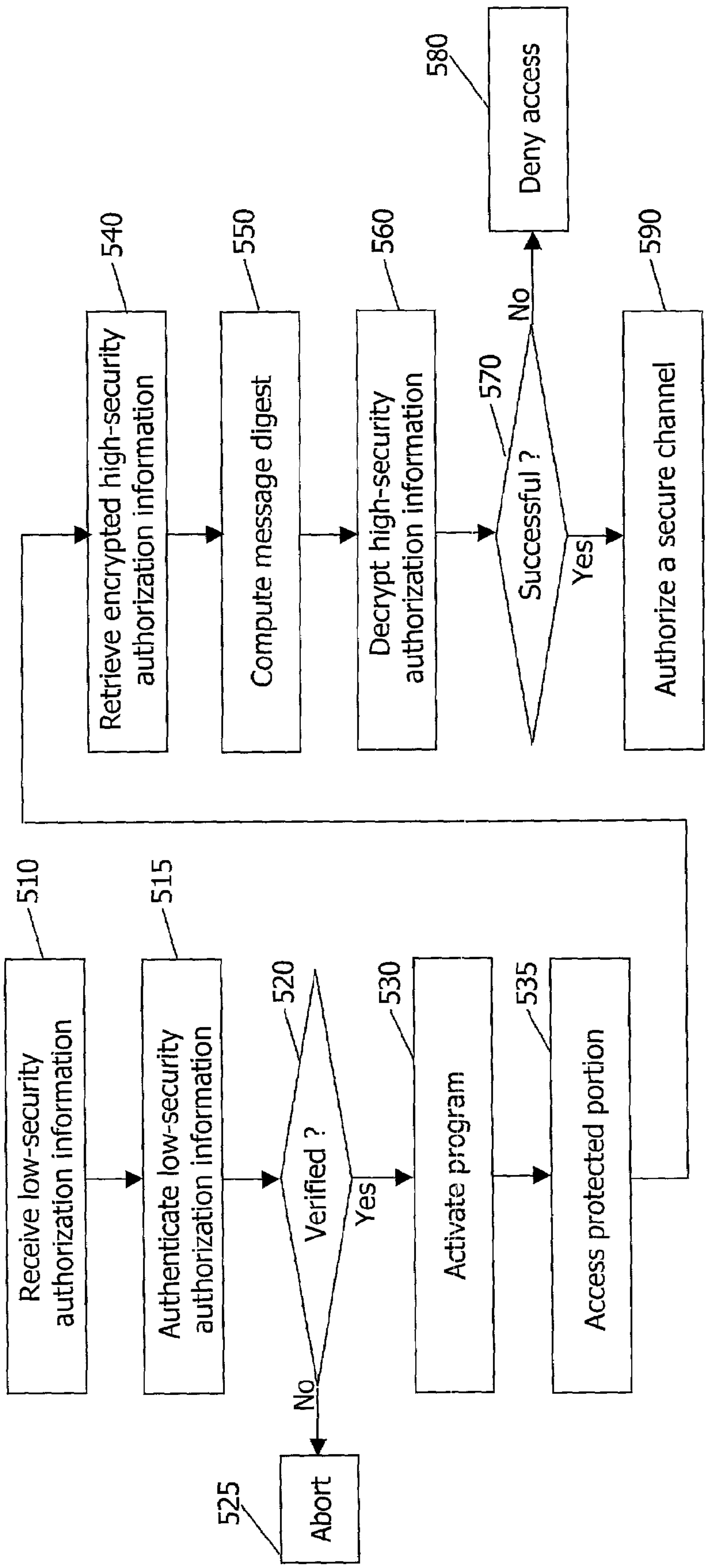
FIG. 5 is an exemplary flowchart of a process, in which high-security protection, set up for a secure program, is enforced, according to an embodiment of the present invention.

FIG. 5 is an exemplary flowchart of a process, in which the high-security protection mechanism 140 enforces tamper-resistant high-security protection on a protected portion (e.g., 115) of a program (e.g., 110), according to an embodiment of the present invention. To activate the program 110, low-security protection may be first enforced. This may involve authenticating the party (either a person or an application program) that initiates the activation of the program 110. In FIG. 5, low-security authorization information 175 is first received, at 510, from the initiating party. The low-security authentication is performed at 515 based on the received low-security authorization information 175. If the authentication fails, determined at 520, the initiation of the program is aborted at 525.

If the low-security authentication is successful, the program 110 is activated at 530. The unprotected portion 112 of the program 110 is not involved in ensuring high-security protection. When the protected portion 115 of the program

110 is accessed at 535, the tamper-resistant high-security protection is activated. The encrypted high-security authorization information 145, generated by the high-security set-up mechanism during the initial set up, is first retrieved, at 540, from the encrypted authorization information storage 340.

To decrypt the encrypted high-security authorization information 145, the encryption function 310 located in the protected portion 115 of the program 110 computes, at 550, the message digest 120*b* at runtime from the protected portion 115. The message digest 120*b* is used to decrypt, at 560, the encrypted high-security authorization information 145. If the protected portion 115 is tampered, the message digest 120*b* differs from the message digest 120*a* that is initially used to encrypt the high-security authorization information. In this case, the message digest 120*b* generated from the runtime protected portion 115 can not be successfully used as a decryption key to decrypt the high-security authorization information. The access to the protected data source is, therefore, denied at 580. If the decryption is successful, determined at 570, the access to the protected portion 115 is granted and a secure channel is authorized, at 590, between the protected portion 115 of the program 110 and the data storage 380.

Figure 6:
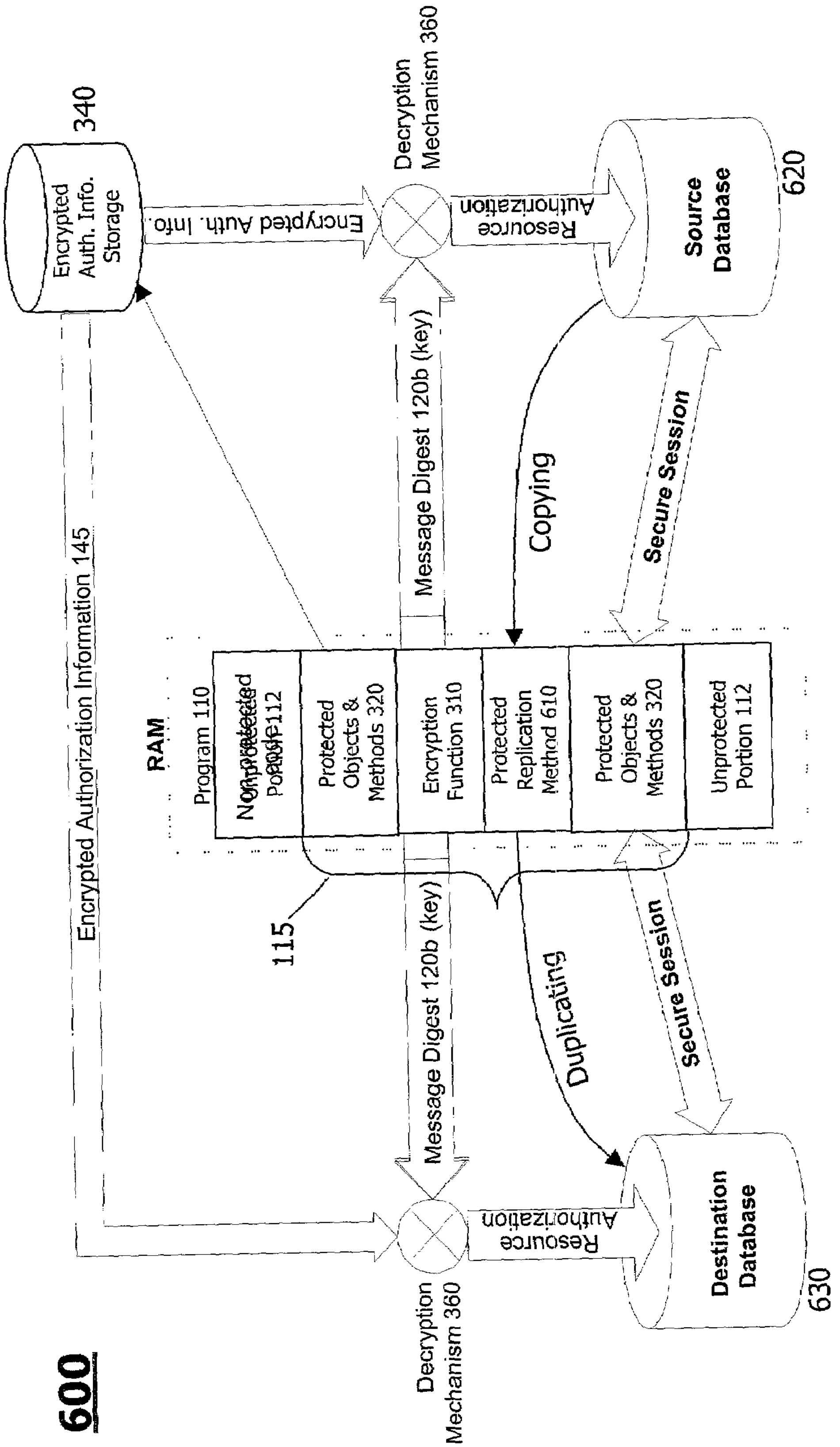
FIG. 6 depicts a high level functional diagram of a secure document replication mechanism according to an embodiment of the present invention.

FIG. 6 depicts a high level functional diagram of a secure data replication mechanism according to an embodiment of the present invention. In FIG. 6, secure data replication mechanism 600 utilizes the tamper-resistant high-security software protection mechanism 100 to realize secure data replication. In FIG. 6, a program 110 includes a replication method 610 that is aggregated into a protected portion 115 with other protected objects and/or methods (320) and encryption function 310. The function that the replication method 610 performs is to make a copy of the data stored in a source database, 620, and to duplicate the data in a destination database, 630.

To ensure safe data replication, the replication method 610 may be designed so that it does not reveal the content of the data that is being replicated. The security of the replicated data relies on such a design feature. If such design feature is compromised (e.g., by software tampering), the confidentiality of the secure data is also compromised. In FIG. 6, the tamper-resistant high-security software protection mechanism 100 is applied to protect the replication method 610 against tampering. With the tamper-resistant protection, if software tampering (e.g., the code of the replication method is changed to reveal the replicated data) is identified (by the tampering-resistant high-security protection mechanism), the data replication mechanism depicted in FIG. 6 will not be able to authorize access to the data sources (so that no data will be exposed).

Data replication may include data copying (from a source database, e.g., 620) and data duplicating (to a destination database, e.g., 630). In the exemplary embodiment illustrated in FIG. 6, both copying and duplicating may be protected against tampering. To establish a session to copy secure data from the source database 620, the protected replication method 610 is activated. Prior to copying, the tamper-resistant high-security protection is enforced. The encryption function 310 computes a fingerprint 120*b*. The decryption mechanism 360 retrieves the stored encrypted authorization information and decrypts it using the fingerprint 120*b* as a key. If the decryption is successful (which means that the protected replication method is not tampered), the access channel is open and the replication method 610 proceeds with copying of the data stored in the source database 620.

Prior to establishing a session to duplicate the secure data in the destination database 630, the tamper-resistant high-security protection is enforced. The encryption function 310 computes the fingerprint 120*b*. If the fingerprint 120*b* enables a successful decryption of the encrypted high-security authorization information, the protected replication method proceeds with duplicating the secure data in the destination database 630.

Figure 7:
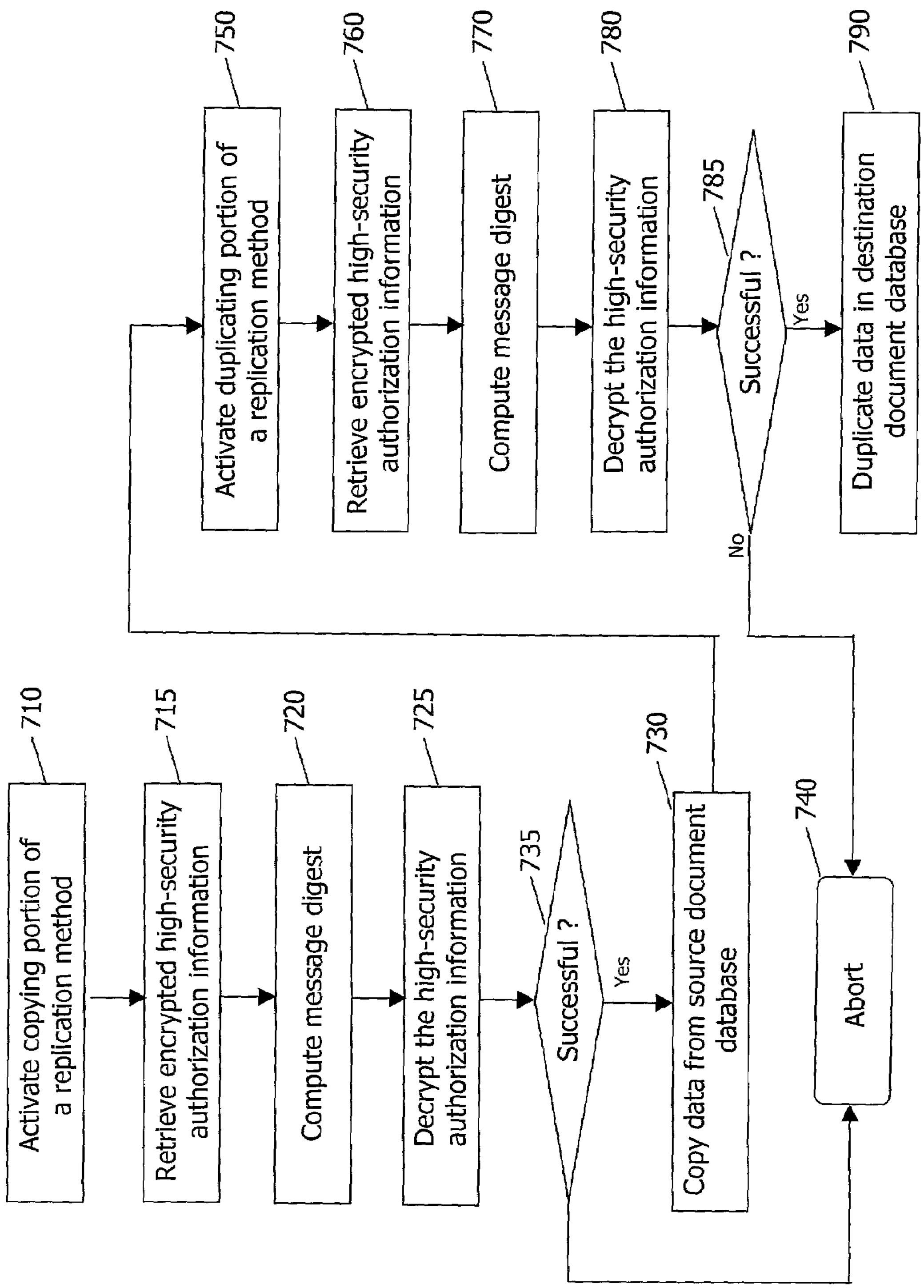
FIG. 7 is an exemplary flowchart for a secure document replication mechanism according to an embodiment of the present invention.

FIG. 7 is an exemplary flowchart for a secure document replication mechanism 600 according to an embodiment of the present invention. The protected replication method is first activated, at 710, to copy data from a source database (620). Prior to the execution, encrypted high-security authorization information 145 is retrieved, at 715, from the encrypted authorization information storage 340. The encryption function 310 computes, at 720, the message digest 120*b* from the protected portion 115.

The generated message digest 120*b* is used, at 725, to decrypt the high-security authorization information 145. If decryption is not successful, determined at 735, the data replication is aborted. If decryption is successful, the protected replication method 610 copies data, at 730, from the source database (620).

Prior to duplicating data in the destination database (630), the encrypted authorization information is retrieved at 760. The encryption function 310 computes, at 770, the message digest 120*b* which is then used to decrypt the retrieved encrypted authorization information at 780. If the decryption is successful, determined at 785, the replication method proceeds to duplicate, at 790, the data copied from the source database (620) to the destination document database (630). If decryption is not successful, the replication is aborted at 740.

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof The actual software code or hardware used to implement the present invention is not limiting of the present invention. Thus, the operation and behavior of the embodiments often will be described without specific reference to the actual software code or hardware components. The absence of such specific references is feasible because it is clearly understood that artisans of ordinary skill would be able to design software and hardware to implement the embodiments of the present invention based on the description herein with only a reasonable effort and without undue experimentation.

A procedure is here, and generally, conceived to be a self-consistent sequence of operations leading to a desired result. These operations comprise physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of the present invention described herein; the operations are machine operations. Useful machines for performing the operations of the present invention include general purpose digital computers, special purpose computer or similar devices.

Each operation of the method may be executed on any general computer, such as a mainframe computer, personal computer or the like and pursuant to one or more, or a part of one or more, program modules or objects generated from any programming language, such as C++, Java, Fortran, etc. And still further, each operation, or a file, module, object or the like implementing each operation, may be executed by special purpose hardware or a circuit module designed for that purpose. For example, the invention may be implemented as a firmware program loaded into non-volatile storage or a software program loaded from or into a data storage medium as machine-readable code, such code being instructions executable by an array of logic elements such as a microprocessor or other digital signal processing unit. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on.

In the case of diagrams depicted herein, they are provided by way of example. There may be variations to these diagrams or the operations (or operations) described herein without departing from the spirit of the invention. For instance, in certain cases, the operations may be performed in differing order, or operations may be added, deleted or modified.

An embodiment of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product. Such an article of manufacture, program storage device or computer program product may include, but is not limited to, CD-ROM, CD-R, CD-RW, diskettes, tapes, hard drives, computer system memory (e.g. RAM or ROM), and/or the electronic, magnetic, optical, biological or other similar embodiment of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, whether magnetic, biological, optical, or the like, for storing or transmitting signals readable by a machine for controlling the operation of a general or special purpose computer according to the method of the invention and/or to structure its components in accordance with a system of the invention.

An embodiment of the invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such as a cellular telephone).

The system may be specially constructed for the required purposes to perform, for example, the method of the invention or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

While this invention has been described in relation to preferred embodiments, it will be understood by those skilled in the art that other embodiments according to the generic principles disclosed herein, modifications to the disclosed embodiments and changes in the details of construction, arrangement of parts, compositions, processes, structures and materials selection all may be made without departing from the spirit and scope of the invention. Changes, including equivalent structures, acts, materials, etc., may be made, within the purview of the appended claims, without departing from the scope and spirit of the invention in its aspects. Thus, it should be understood that the above described embodiments have been provided by way of example rather than as a limitation of the invention and that the specification and drawing(s) are, accordingly, to be regarded in an illustrative rather than a restrictive sense. As such, the present invention is not intended to be limited to the embodiments shown above but rather is to be accorded the widest scope consistent with the principles and novel features disclosed in any fashion herein.

What is claimed is:

1. A method of providing high-security protection for an electronic informational resource, the program having a protected portion, the method comprising:

encrypting high-security authorization information using a first fingerprint as a key to generate an encrypted high-security authorization information, the first fingerprint being computed based on the protected portion of the program; and upon a request to access the protected portion of the program, decrypting the encrypted high-security authorization information using a second fingerprint, the second fingerprint being computed based on the protected portion of the program.

2. The method according to claim 1, wherein the first fingerprint and second fingerprint are one-way hashes computed from a portion of a memory where the protected portion of the secure program resides.

3. The method according to claim 1, further comprising:

authorizing a secure channel between the protected portion of the program and a data processing mechanism if and only if the decrypting is successful.

4. A method of establishing high-security protection for a data source using a program having a protected portion, the method comprising:

receiving high-security authorization information that is used to establish protection for the data source;

computing a fingerprint based on the protected portion of the program; and encrypting high-security authorization information using the fingerprint.

5. The method according to claim 4, wherein the program is activated and the fingerprint is a message digest computed based on a portion of a memory where the protected portion of the activated program resides.

6. The method according to claim 4, wherein said high-security authorization information includes a password.

7. The method according to claim 4, wherein said high-security authorization information includes a token.

8. A method for high-security protection of a data source via a program, the program having a protected portion, the method comprising:

upon activating the program, computing a fingerprint based on the protected portion of the program; and verifying that the protected portion of the program is not tampered through decrypting an encrypted high-security authorization information using the fingerprint.

9. The method according to claim 8, further comprising:

prior to activating the program, receiving low-security authorization information;

authenticating the low-security authorization information;

if said low-security authorization information is authenticated, allowing the activating of the program; and if said low-security authorization information is not authenticated, not activating the program.

10. The method according to claim 8, further comprising:

if the protected portion of the program is not tampered, authorizing a secure channel between the protected portion of the secure program and a data processing mechanism, the data processing mechanism accessing information from the data source through the secure channel.

11. A method for secure data replication, comprising:

activating a protected portion of a program, said protected portion replicating data stored in a first database in a second database;

establishing a first secure session, between the protected portion and the first database to copy data from the first database, using a first fingerprint computed based on the protected portion; and establishing a second secure session, between the protected portion and the second database to replicate the data in the second database, using a second fingerprint computed based on the protected portion.

12. The method according to claim 11, wherein the first fingerprint is a first message digest and establishing a first secure session comprises:

computing the first fingerprint from the protected portion of the program;

decrypting an encrypted authorization information using the first fingerprint as a key; and if the encrypted authorization information is successfully decrypted, copying the data from the first database.

13. The method according to claim 11, wherein the second fingerprint is a second message digest and establishing a second secure session comprises:

computing the second message digest from the protected portion of the program;

decrypting an encrypted authorization information using the second fingerprint as a key; and if the encrypted authorization information is successfully decrypted, duplicating the data in the second database.

14. A system, comprising:

a program having a protected portion;

a high-security set up mechanism for establishing high-security protection to a data resource using the protected portion of the program based on encrypted high-security authorization information generated using a fingerprint computed based on the protected portion of the program; and a high-security protection mechanism for enforcing high-security protection on the protected portion of the program using the encrypted high-security authorization information.

15. The system according to claim 14, wherein the protected portion includes an encryption function that computes the fingerprint based on the protected portion of the program.

16. The system according to claim 14, wherein the high-security set up mechanism comprises:

an encryption mechanism for encrypting a high-security authorization information to generate, using the fingerprint as a key, the encrypted high-security authorization information; and an encrypted high-security authorization information storage for storing the encrypted high-security authorization information.

17. The system according to claim 16, wherein the high-security protection mechanism comprises:

a high-security information retrieval mechanism for accessing encrypted high-security authorization information from the encrypted high-security authorization information storage; and a decryption mechanism for decrypting, using a second fingerprint as a key, the encrypted high-security authorization information, a second fingerprint being computed based on the protected portion of the program.

18. A computer program product including computer program code to cause a microprocessor to perform a method of providing high-security protection for a data resource, the program having a protected portion, the method comprising:

encrypting high-security authorization information using a first fingerprint to generate an encrypted high-security authorization information, the first fingerprint being computed based on the protected portion of the program; and upon a request to access the protected portion of the program, decrypting the encrypted high-security authorization information using a second fingerprint, the second fingerprint being computed based on the protected portion of the program.

19. The computer program product according to claim 18, wherein the first fingerprint and second fingerprint are one-way hashes computed from a portion of a memory where the protected portion of the secure program resides.

20. The computer program product according to claim 18, the method further comprising:

authorizing a secure channel between the protected portion of the program and a data processing mechanism if the decrypting is successful, the data processing mechanism accessing the protected portion of the program through the secure channel.

21. A computer program product including computer program code to cause a microprocessor to perform a method of establishing high-security protection for a data resource, the program having a protected portion, the method comprising:

receiving high-security authorization information used to establish protection for the data resource;

computing a fingerprint based on a protected portion of the program; and generating encrypted high-security authorization information using the fingerprint.

22. The computer program product according to claim 21, wherein the program is activated and the fingerprint is a message digest computed based on a portion of a memory where the protected portion of the activated program resides.

23. The computer program product according to claim 21, wherein said high-security authorization information includes a password.

24. A computer program product including computer program code to cause a microprocessor to perform a method for high-security protection of a data resource via a program, the program having a protected portion, the method comprising:

upon activating the program, computing a fingerprint based on the protected portion of the program; and verifying that the protected portion of the program is not tampered through decrypting an encrypted high-security authorization information using the fingerprint.

25. The computer program product according to claim 24, further comprising:

prior to activating the program, receiving low-security authorization information;

authenticating the low-security authorization information;

if said low-security authorization information is authenticated, allowing the activating of the program; and if said low-security authorization information is not authenticated, not activating the program, computing a fingerprint and verifying that the protected portion of the program is tampered.

26. The computer program product according to claim 24, further comprising:

if the protected portion of the program is not tampered, authorizing a secure channel between the protected portion of the secure program and a data processing mechanism, the data processing mechanism accessing information from the data resource through the secure channel.

27. A computer program product including computer program code to cause a microprocessor to perform a method for secure data replication, the method comprising:

activating a protected portion of a program, said protected portion replicating data stored in a first database in a second database;

establishing a first secure session, between the protected portion and the first database to copy data from the first database, using a first fingerprint computed based on the protected portion; and establishing a second secure session, between the protected portion and the second database to replicate the data in the second database, using a second fingerprint computed based on the protected portion.

28. The computer program product according to claim 27, wherein the first fingerprint is a first message digest and establishing a first secure session comprises:

computing the first fingerprint from the protected portion of the program;

decrypting an encrypted authorization information using the first fingerprint as a key; and if the encrypted authorization information is successfully decrypted, copying the data from the first database.

29. The computer program product according to claim 27, wherein the second fingerprint is a second message digest and establishing a second secure session comprises:

computing the second fingerprint from the protected portion of the program;

decrypting an encrypted authorization information using the second fingerprint as a key; and if the encrypted authorization information is successfully decrypted, duplicating the data in the second database.

* * * * *